US005226599A

United States Patent [19]

Lindermeir et al.

[11] Patent Number: 5,226,599

[45] Date of Patent: Jul. 13, 1993

[54] FLUSH SPRINKLER

[75] Inventors: Wolfgang Lindermeir, Untermarchtal; Ram K. Agrawal, Neu-Ulm; Johann Schäffer, Laupheim; Frantz Lopic, Nersingen; Christian Stephany, Ulm, all of Fed. Rep. of Germany

[73] Assignee: Gardena Kress & Kastner GmbH, Fed. Rep. of Germany

[21] Appl. No.: 869,892

[22] Filed: Apr. 15, 1992

Related U.S. Application Data

[63] Continuation of Ser. No. 556,839, Jul. 23, 1990, abandoned.

[30] Foreign Application Priority Data

Jul. 27, 1989 [DE] Fed. Rep. of Germany ....... 3924793

[51] Int. Cl.[5] ........................ A01G 25/06; B05B 1/14; B05B 1/26

[52] U.S. Cl. .................................... 239/205; 239/206; 239/104; 239/231; 239/242; 239/246; 239/515; 239/DIG. 1

[58] Field of Search ............... 239/104, 106, 110, 111, 239/113, 204-206, 228, 231, 242, 246, 436, 442, 443, 446, 462, 512-515, DIG. 1

[56] References Cited

U.S. PATENT DOCUMENTS

| | | | |
|---|---|---|---|
| 1,788,492 | 1/1931 | Nelson . | |
| 1,871,258 | 8/1932 | Coles et a;l. | 239/206 |
| 2,313,994 | 3/1943 | Grant . | |
| 2,778,677 | 1/1957 | Gould et al. | 239/512 |
| 2,820,676 | 1/1958 | Cleaves | 239/446 |
| 2,905,196 | 9/1959 | Van Wagenen et al. | 239/110 |
| 3,268,173 | 8/1966 | Costa | 239/206 |
| 3,645,451 | 2/1972 | Hauser | 239/242 |
| 3,655,132 | 4/1972 | Rosic | 239/206 |
| 3,674,210 | 7/1972 | Faragasso | 239/204 |
| 3,758,038 | 9/1973 | Ridgway | 239/206 |
| 3,770,203 | 11/1973 | Dyar | 239/205 |
| 3,782,638 | 1/1974 | Bumpstead | 239/242 |
| 3,874,588 | 4/1975 | Flynn | 239/206 |
| 3,998,390 | 12/1976 | Peterson et al. | 239/443 |
| 4,078,726 | 3/1978 | Walto | 239/113 |
| 4,253,608 | 3/1981 | Hunter | 239/206 |
| 4,625,914 | 12/1986 | Sexton et al. | 239/206 |
| 4,634,052 | 1/1987 | Grizzle et al. | 239/DIG. 1 |
| 4,699,321 | 10/1987 | Bivens et al. | 239/204 |
| 4,752,031 | 6/1988 | Merrick | 239/193 |
| 4,773,595 | 9/1988 | Livne | 239/242 |
| 4,867,378 | 9/1989 | Kah, Jr. | 239/206 |
| 4,892,252 | 1/1990 | Bruninga | 239/206 |
| 4,925,098 | 5/1990 | Di Paola | 239/242 |

FOREIGN PATENT DOCUMENTS

| | | |
|---|---|---|
| 4597 | 8/1953 | Fed. Rep. of Germany . |
| 2036462 | 1/1972 | Fed. Rep. of Germany . |
| 2462474 | 10/1986 | Fed. Rep. of Germany . |
| 965941 | 8/1964 | United Kingdom . |

*Primary Examiner*—Andres Kashnikow
*Assistant Examiner*—Karen B. Merritt
*Attorney, Agent, or Firm*—Quarles & Brady

[57] ABSTRACT

A flush sprinkler has a sprinkler unit raisable and lowerable in hydraulic manner in a shaft and, several nozzle units, which, as required, can be switched into a sprinkling state with an upper nozzle selecting handle and whose nozzle jets can be modified independently by a jet spreading member adjustable with an associated jet adjusting handle. There are also rings for varying a spray spreading angle as a function of size and position. The handles are raisable and lowerable with the sprinkler unit and therefore easily accessible. For cleaning the bearing of the sprinkler unit, an automatically valve-controlled flushing device is provided. For the reliable draining of the sprinkler, a drain valve is provided directly in the water flow and its body is clipped into a valve bore of the shaft.

39 Claims, 4 Drawing Sheets

Fig. 1
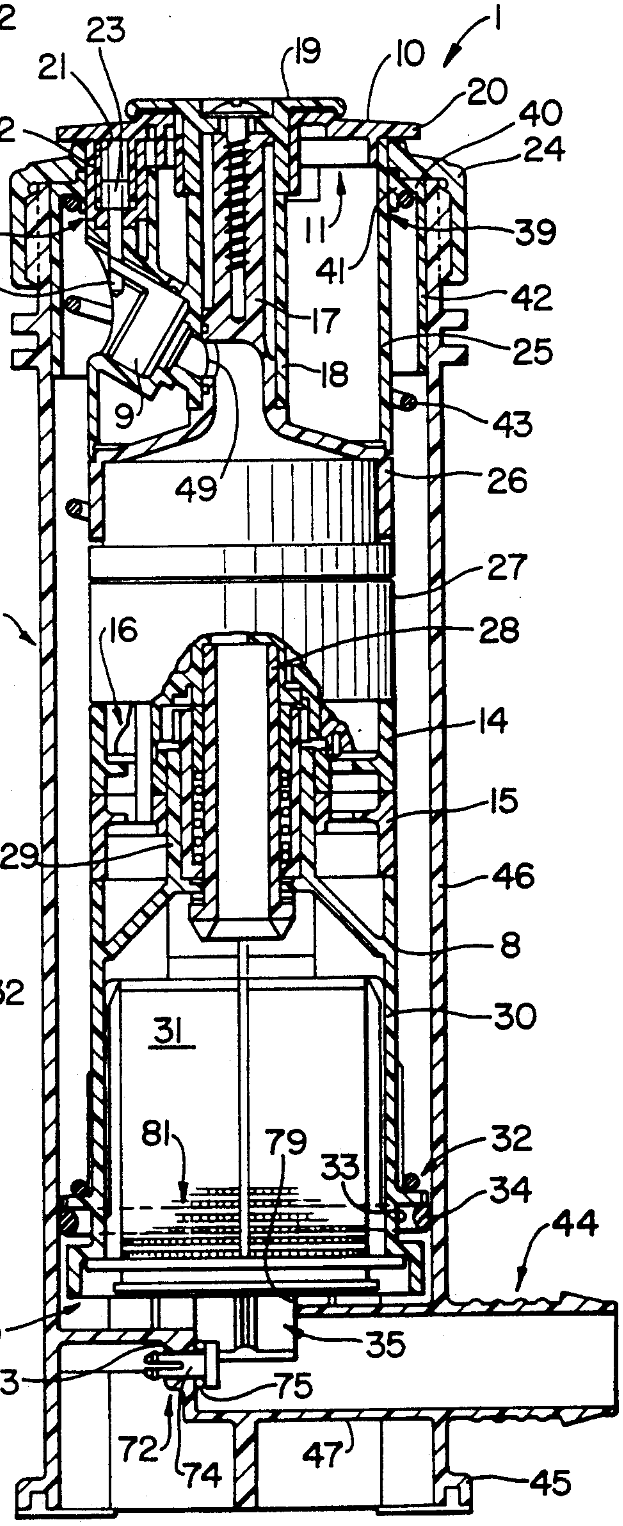
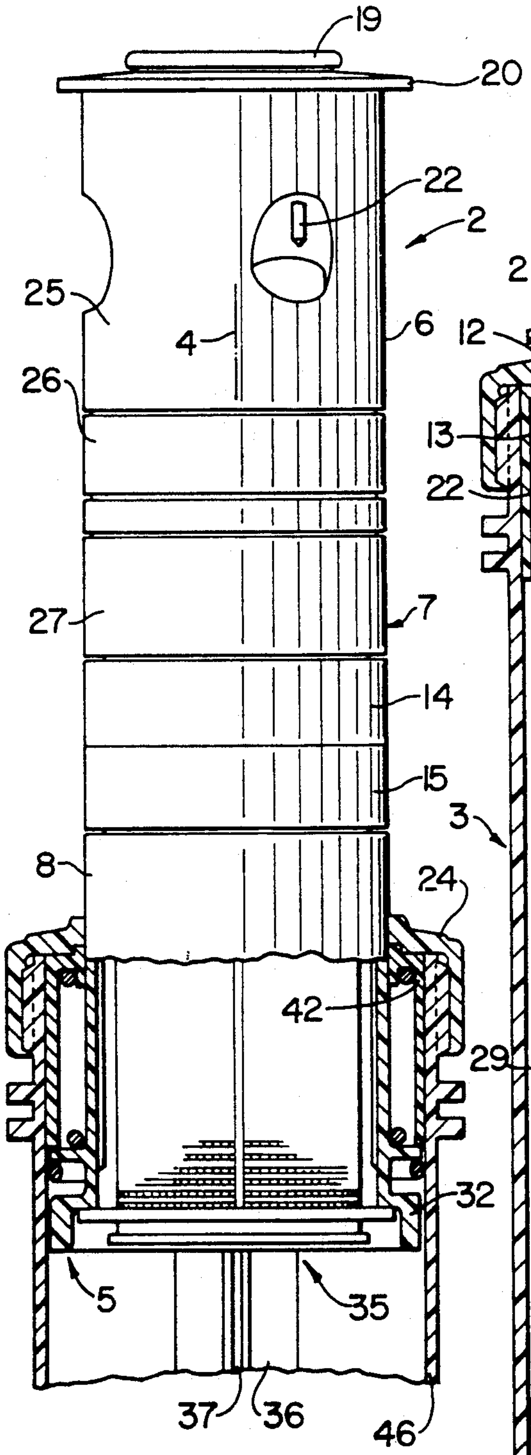
Fig. 2

Fig. 7
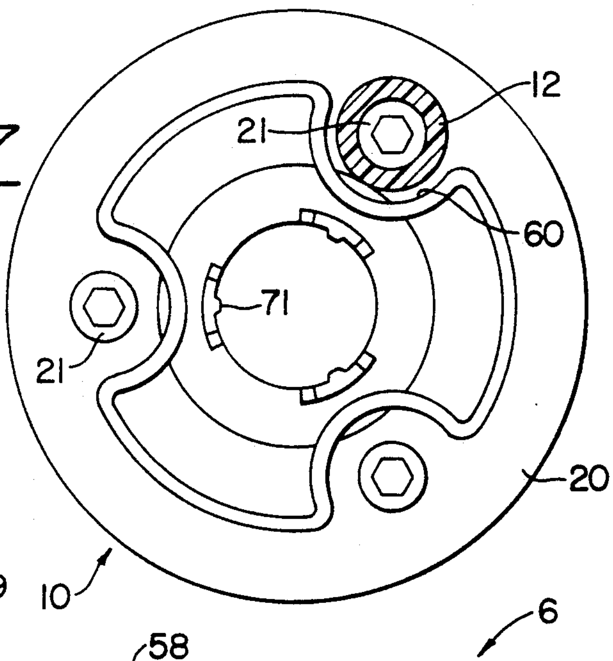
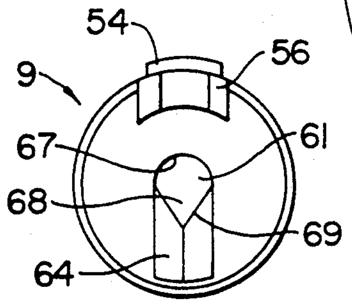
Fig. 5
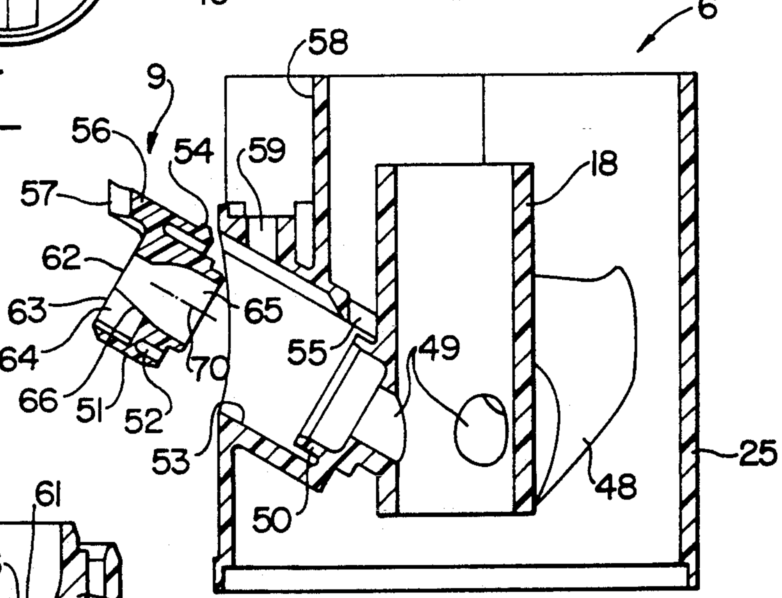
Fig. 3
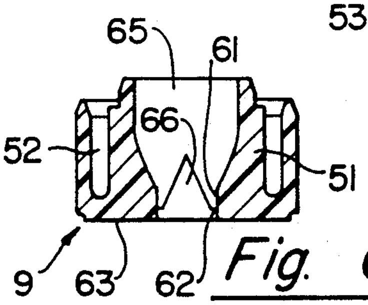
Fig. 6
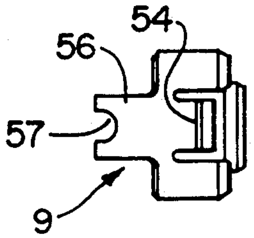
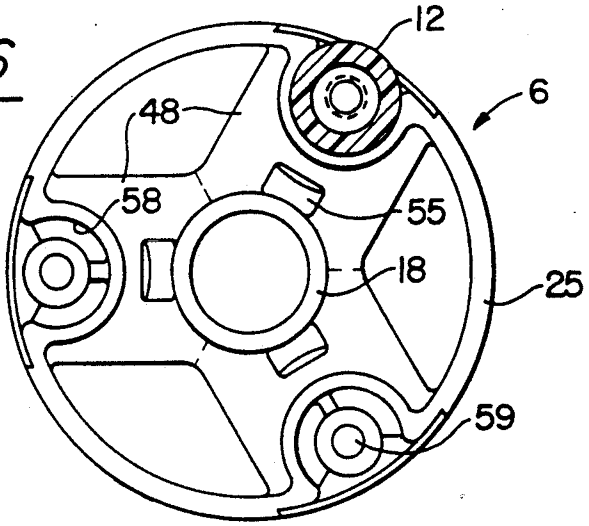
Fig. 4

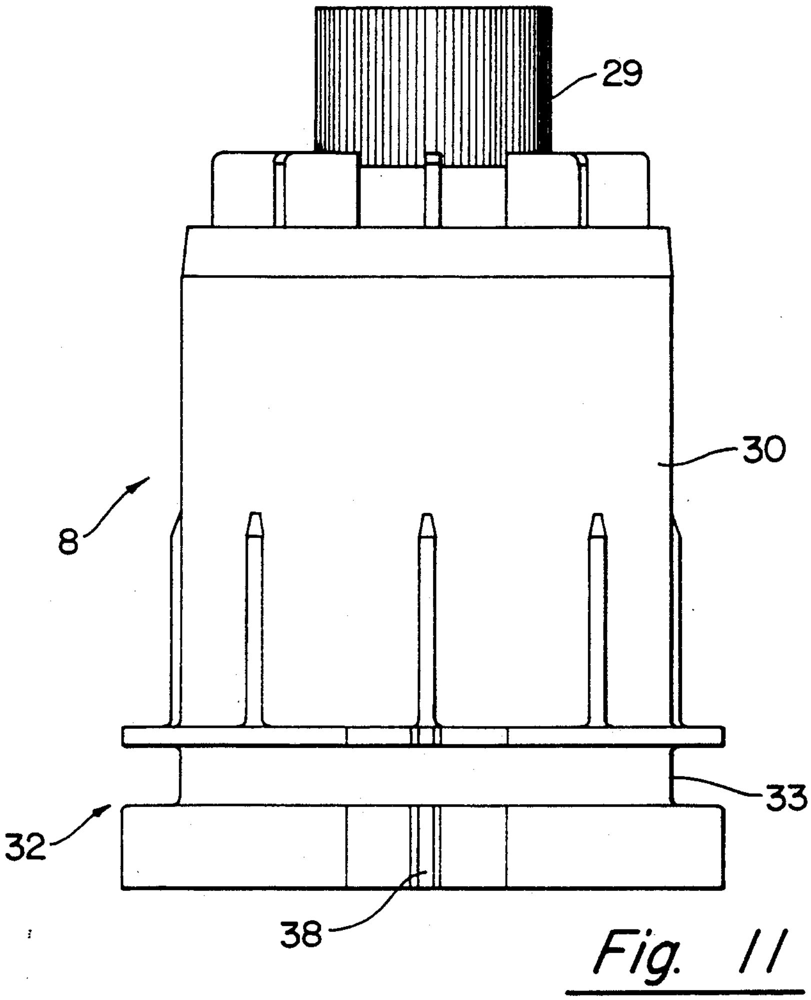
Fig. 11
Fig. 12
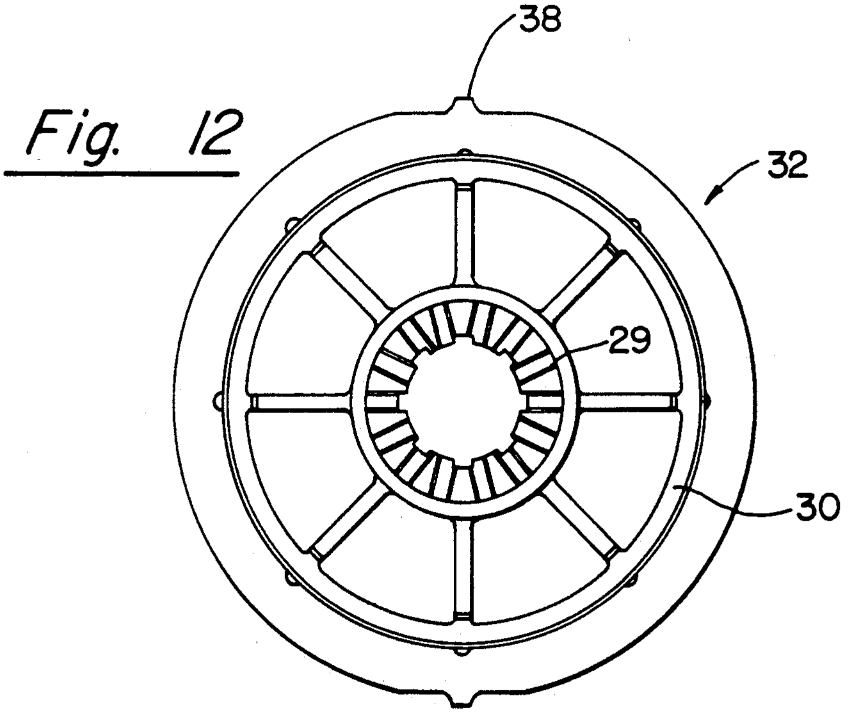

FLUSH SPRINKLER

This is a continuation of application Ser. No. 556,839, filed Jul. 23, 1990, now abandoned.

BACKGROUND OF THE INVENTION

1. Field of the Invention

The invention relates to a flush sprinkler, whose sprinkler unit for discharging water is transferred between a working position and a non-use position, preferably by raising and lowering, so that it remains at the same location, in a garden or the like, without it having to be dismantled when not in use. Such flush sprinklers are generally anchored with a lower end region in the soil or ground, are connected below the soil surface to a completely concealed water main, and at least in the working position, project upwards above the ground, e.g. by means of a nozzle head.

It is advantageous for such watering, irrigating or sprinkling means to be adjustable or settable with respect to at least one working characteristic, so that it is possible to adjust the size of the watered area, its position, the watering intensity, etc.

2. Prior Art

DE-OS 20 36 462 e.g. discloses a watering means in which the water supply can be varied with a handle located on the component flush-mounted in the ground, namely, a shaft receiving the watering unit in a raisable and lowerable manner. The handle turns the entire shaft, which is naturally hindered, as a function of the soil characteristics, by a varying sliding friction with respect to the soil. Such movement also easily leads to dirtying. By merely increasing or decreasing the water supply it is only possible to vary the working characteristic to a very limited extent.

Much the same applies with regards to the watering means disclosed in German Patent 24 62 474. The spray pattern is substantially uncontrollably modified because on turning the nozzle head, individual spray nozzles are successively controlled by a stationary disk cam. Thus, although the nozzle head performs complete turns, water is essentially only discharged from the spray nozzles in the same segmental area, namely those in which the nozzles are supplied with water via a control opening in the disk cam. There is no manual adjustability of said segmental area or its position with respect to a central axis.

SUMMARY OF THE INVENTION

An object of the invention is to provide a flush sprinkler of the aforementioned type in which the disadvantages of the prior art are avoided and which can be adapted in many different ways to the watering requirements. The flush sprinkler is preferably easy to handle and is secured against unintentional adjustment.

In order to achieve this object the flush sprinkler has one or more adjusting devices for varying in each case at least one of the working characteristics, such as the spray width, the spray density, the spray jet fanning pattern, the size of the watered area, the position of the watered area, etc. At least one handle of at least one adjusting device in at least one position of the flush sprinkler is spaced above the predetermined ground surface level, preferably on a component raisable and lowerable with the sprinkler unit and in particular on the sprinkling unit. This makes said handle, particularly in the working position of the flush sprinkler, very easily accessible, and it is possible to either position the handle in such a way that it is inaccessibly encapsulated in the inoperative or flush-mounted position of the sprinkler unit, or is accessible from its top surface.

For example, at least one handle can be an upper, disk-like cover on the upper end of the sprinkler unit to protect the unit and optionally a shaft receiving the sprinkler unit in the flush position against the penetration of water, dirt, etc. 11. The cover appropriately cooperates as a closing piece with an upper end cap of the shaft. Another handle can be located directly below the upper end on the sprinkler unit. This second handle can have a much smaller circumference than the sprinkler unit and can be located in the vicinity of the outer circumferential surface of said sprinkler unit, so that after raising the unit, the handle is easily accessible. Several such handles can be housed in the same longitudinal area of the sprinkler unit for several circumferentially distributed spray nozzles. Still another type handle can also be provided below the nozzle head, or below at least one spray nozzle, to form in the manner of a ring a longitudinal portion of the outer circumference or outer casing of the sprinkler unit. In order to manually raise the sprinkler unit independently of the water supply, e.g. for maintenance or for making adjustments, it is appropriate to provide a corresponding device to be operated with a gripping handle advantageously positioned at the upper end of the sprinkler unit. In a simple embodiment it can be formed by an annular gripping edge of an adjusting device, which for setting the latter is rotatable about a central axis of the sprinkler unit, while it can be engaged from below for manually raising the sprinkler unit out of the flush or concealed position. This combination handle and adjusting device can also be used for blocking the water supply to a particular spray nozzle or to all the spray nozzles, so that the sprinkler unit can then also be raised hydraulically under hydraulic pressure without water being discharged.

It is particularly appropriate if water only exits from a single spray nozzle in the working state, but if several different spray nozzles are distributed in a roughly radially outwardly directed manner about the central axis of the sprinkler unit, each of said nozzles can be connected to the water supply by switching. Thus, nozzles with different spray characteristics can be provided and, as a function of the requirements, can be used as required by switching the associated adjusting device. In addition, each spray nozzle can be associated with an adjusting device to adjust a jet spreading member to a greater or lesser extent roughly radially from the outside in to the spray jet exiting the nozzle, said jet spreading member then being fixed in the set position with respect to the associated spray nozzle. This jet spreading unit can fan out the spray jet to a greater or lesser extent, enabling both the shape and size of its cross-section and also its range to be modified. The nozzle opening of the spray nozzle or the jet spreading member is countersunk within a widened exit depression of the sprinkler unit, so that the relatively widely deflected parts of the spray jet can once again undergo a certain bundling or focussing on the inner face of said depression.

According to a further development of the invention, a sprinkler head of the sprinkler unit, which has at least one of the spray nozzles, is automatically pivotable or rotatable during operation about an approximately vertical central axis of the sprinkler unit. A drive for this purpose is appropriately provided, driven by the fluid or water to be sprayed and which therefore flows through the sprinkler unit. Preference is given to the use of a hydraulic geared motor similar to that of German patent application P 38 33 984.6, to which reference should be made for further details and effects. It is only necessary to adapt an end carrier provided at the upper end of the motor and an end cap provided at the upper end, together with adjusting rings on the connected areas of the sprinkler unit. This drive can form a longitudinal portion of the sprinkler unit in such a way that the outer circumference of its motor, gear and control casing, as well as its adjusting rings form the outer circumference of said longitudinal portion. Preferably, the sprinkler head is driven in such a way that it can rotate, at maximum, over an arc angle of approximately 360°, but performs a reciprocating rotary movement, whose arc angle and position with respect to the sprinkler axis can be modified with one of the aforementioned adjusting devices. As the water supply to a particular spray nozzle exclusively passes through the interior of the drive casing, the latter requires no further covering.

The inventive sprinkler unit can be assembled in simple modular manner from at least two longitudinal portions, which in each case form a closed subassembly. The sub-assemblies are assemblable and/or screwable together in a longitudinal direction, optionally accompanied by bonding. One subassembly is appropriately a base body forming the lower end of the sprinkler unit and which simultaneously constitutes the lower end carrier for the rotary reception of the remainder of the sprinkler unit or the sprinkler head. To the upper end of said base body is appropriately connected, as a further subassembly, the drive with a hydraulic motor. The drive is connected by means of a hollow shaft to the base body so that it can rotate with respect to the base body. At the lower end of the hydraulic motor or the drive casing are appropriately provided, as a subassembly, to directly adjacently superimposed adjusting rings for the manual setting of the associated adjusting device. These adjusting rings which surround a hollow shaft are positioned between the drive casing and the base body. A sprinkler head is connected to the upper end of the hydraulic motor as a further subassembly. A subassembly containing at least one of the described handles between the outer circumference of the sprinkler unit and the inner circumference of the shaft. All the subassemblies are interconnected in an almost continuous manner and have the same external cross-sections or external diameters, so that a relatively smooth-surfaced outer jacket for the sprinkler unit is obtained. Over the upper end can radially project the top handle and over the lower end a reciprocating piston is formed in one piece with the base body.

According to the invention, there is also a device for the cleaning or lubricating flushing of at least one bearing of the sprinkler unit, and in particular, a lift bearing. Appropriately, an upper bearing of the sprinkler unit is provided in the vicinity of its passage through the upper end of the shaft, while a lower bearing is formed with respect to the shaft by a reciprocating piston. The device is constructed in such a way that flushing is blocked in the working position of the sprinkler unit, while in at least one position differing therefrom and in particular substantially over the entire stroke, flushing is opened in such a way that part of the water supplied to the flush sprinkler is branched off and flushes the bearing gaps. This can be achieved in a very simple manner. At least one piston packing is deformed in a limited, loose position over the associated part of the stroke by projections on the piston travel path formed through the shaft, so that water can enter from below the annular space between the outer circumference of the sprinkler unit and the inner circumference of the shaft, which space is free from components other than possibly a restoring or return spring. Water can pass out upwards from the upper bearing accompanied by flushing during the stroke. The projections only extend so far upwards that they substantially free the piston packing in the upper stroke end position, so that complete tight closure is obtained and no further water can pass through. The projections can simultaneously be used in the manner of longitudinal guides for providing a positive protection against the the turning of the sprinkler unit or its base body with respect to the shaft.

Particularly in locations where there is a frost risk, it is important to have automatic draining of the flush sprinkler, as is known from German Utility Model 80 08 808. The use of a valve having a valve housing and constructed as a closed subassembly is relatively costly and prone to faults. However, according to the invention, a drain valve is not prone to faults is proposed which comprises a very small number of simple components. Appropriately said drain valve has a bolt or pin-like valve closure, which is positioned in a draining bore of the shaft so that the valve housing is constructed in one piece with the shaft. A valve spring opening the valve closure in pressure dependent manner can be a valve packing e.g. an O-ring. In radial view, the O-ring is curved in the relieved state, so that it can only be transferred from this curved state into its approximately uncurved sealing position under pretension. This packing ring, surrounding the valve closure and positioned between two faces of the valve closure and the valve housing, moves the valve closure in the pressureless state so far in the direction of its open position that a through-flow gap opens, which gap is penetrated by the water in the shaft, so that the valve closure can be completely transferred into its open position. If a head of the valve closure with its face remote from the valve packing is located at right angles in the water flow supplied by the inlet duct to the square sprinkler, then the drain valve is immediately closed when the water begins flowing. It is also conceivable to provide a separate valve spring for the valve opening. The drain valve is also suitable for shafts other than flush sprinkler shafts, e.g. those which are intended to receive a water main stop valve, a water connected socket, etc.

Also, in the case of shafts for different uses, but particularly in the case of a shaft for a flush sprinkler or the like to be buried in the ground and connected to a water main, it is advantageous to provide means for connecting the water main directly to the shaft without any separate components or fastenings. A plug connection is particularly suitable, where one of its two plug parts is in one piece unitary with the shaft, and the other is in one piece unitary with the main to be connected, e.g. being formed by a hose end of said main. The connecting part of the shaft is formed by a connecting piece or nipple projecting freely, and in particular radially at the lower end, and which has on its outer circumference profilings for securing to the main part to be fitted on.

These and further features of preferred developments of the invention can be gathered from the claims, description and drawings. The individual features can be realized in an embodiment of the invention and in other fields in single form or in the form of subcombinations, and represent advantageous, independently protectable constructions for which protection is hereby claimed. An embodiment of the invention is described hereinafter relative to the drawings.

BRIEF DESCRIPTION OF THE DRAWINGS

FIG. 1 is a side view of an inventive flush sprinkler in axial section and in the concealed position.

FIG. 2 is a side view of the flush sprinkler according to FIG. 1 in the working position.

FIG. 3 is the flush sprinkler head in axial section and on a larger scale.

FIG. 4 is the sprinkler head according to FIG. 3 in plan view.

FIG. 5 is a nozzle unit in front view.

FIG. 6 is the nozzle unit according to FIG. 5 in axial section.

FIG. 7 is a handle of an adjusting device in a view from below.

FIG. 11 is the base body of the sprinkler unit according to FIGS. 1 and 2 in side elevation.

FIG. 12 is the base body according to FIG. 11 in plan view.

DETAILED DESCRIPTION OF THE PREFERRED EMBODIMENTS

Figure 8:
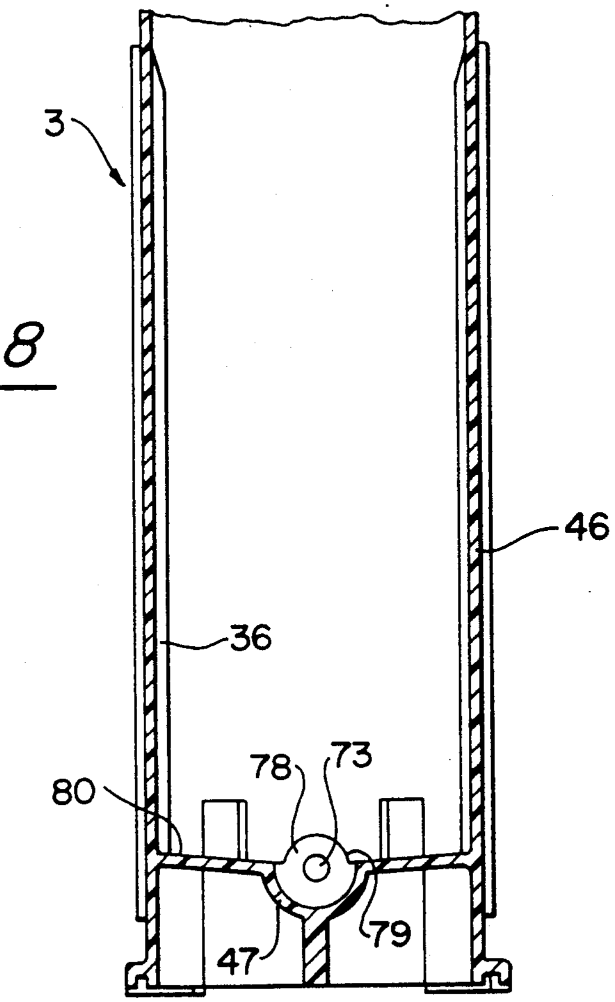
FIG. 8 is a detail of the shaft according to FIG. 1 in axial section.

The flush sprinkler 1 according to FIGS. 1 and 2 has a sprinkler unit 2, mounted in raisable and lowerable manner in e.g. a shaft 3, to be placed in an almost completely concealed manner in the ground. The sprinkler unit 2 has a vertical central axis common to the shaft. In the concealed position the unit 2 only projects above an upper shaft end with a circular disk-like part. For raising purposes, a hydraulic lifting device 5 is provided in the manner of a lifting cylinder working against a restoring spring. The upper portion of the sprinkler unit 2 forms a sprinkler head 6, while the lower, shorter end having half the overall height of the sprinkler unit is formed by a base body 8 associated with the lifting device 5. Between the base body 8 and the sprinkler head 6 a rotary drive 7 is provided whose outer body which carries in stable manner the sprinkler head during operation, is rotatable clockwise and counterclockwise with respect to the base body 8 by an adjustable angle about the central axis 4.

The sprinkler head 6 carries, at the same level, three uniformly circumferentially distributed nozzle units 9, which are concealed or flush with respect to its outer circumference. The axial planes of the nozzle units 9 coincide with the axial planes of the central axis 4, but the nozzle axes rise radially outwards under angles of less than 45°, so that they spray in an upwardly sloping direction. Only one of the nozzle units 9 is in operation in each case. The sprinkler head can be resiliently lockingly set by means of a nozzle selecting device 11 by rotating about the central axis 4. The sprinkler head can be set in such a way that all the nozzles are disconnected. The nozzle selecting device 11 has a circular disk and cap-like handle 10 fixed in non-rotary manner to the sprinkler head 6 and which essentially forms the upper end of the sprinkler unit 2, which engages as a closure in the interior of head 6 and has a portion connected to its upper end and projecting over its outer circumference. Thus, the nozzle selecting handle 10, in the concealed position, engages over the supper passage of the shaft 3 for the sprinkler unit 2 with a limited axial spacing or so as to axially abut, so that a closing cover for the upper shaft opening is formed.

The nozzle selecting handle 10 provides on its underside and together with the sprinkler head 6 in a ring around the central axis a number of jet adjusting devices 13 corresponding to the number of nozzle units 9, enabling the spread of the water jet passing out of the nozzle unit 9 to be modified. Each jet adjusting device 13 has a jet adjusting handle 12 positioned eccentrically to the central axis 4 and rotatable about an axis roughly parallel thereto and which is positioned in axially secured manner between the nozzle selecting handle 10 and the sprinkler head 6 and stable with respect to the same. The cylindrical jet adjusting handles 12 extend approximately flush with the outer circumference of the sprinkler head 6, so that part of the handle circumference, is accessible immediately above the associated nozzle unit 9. A further angle and field adjusting device 16 spaced below the nozzle units 9 is used for modifying the size of the rotation angle of the sprinkler head 6 and for the random positional modification of the spray field determined by said rotation angle with respect to the central axis 4. The angle and field adjusting device 16 has an eccentric switch pin which rotates between stops which are adjustable relative to one another together with the sprinkler head 6 or the outer body of the drive 7. When the pin engages a particular stop, it reverses a double valve through which the water flows so that the drive 7 is reversed with respect to its rotation direction. The stops are provided within two circular or sleeve-like ring handles 14,15, which are axially adjacent and are fixed relative to the base body 8 in the adjusting position and are located between its upper end and the lower end of the outer body of the drive 7. The rings 14,15 like the jet adjusting handles 12 are only accessible after moving the sprinkler unit 2 out of shaft 3 and are then closely juxtaposed above the upper end of the shaft 3. By reciprocal adjustment of the rings 14,15, the magnitude of the rotation angle is modified and by joint adjustment its position with respect to the central axis is modified.

By means of a bearing sleeve 18 open at both ends and located at the inside of the head 6 in radial spacing, the sprinkler head 6 is rotatably engaged on an upwardly projecting bearing shaft 17 and is axially locked with a locking cover 19 fixed to the upper end of said shaft 17. The cover 19 engages over the upper face of the component forming the nozzle selecting handle 10 in such a way that the nozzle selecting handle 10 projects over the outer circumference of the shaft 3 with a circular disk-like gripping ring 20, which forms the closure. The locking cover 19 is prevented from rotating relative to the bearing shaft 17 and can easily be loosened with a central screw, so that the components inside head 6 are readily accessible and can be removed for maintenance and the like. The gripping ring 20 has markings related to the nozzle units 9, a corresponding counter marking being associated therewith on the cover 19. The nozzle selecting handle 10 resiliently locks in the working rotation position with respect to the locking cover 19 in such a way that it can easily be released and moved.

On the lower face of the gripping ring 20 sleeve-like bearing bushes or sockets 21 are provided annularly about the central axis 4. On each of them is mounted from below one of the jet adjusting handles 12 discussed above. The opening of each bearing socket 21 receives an axially displaceable, e.g. through hexagonal cross-sections, correspondingly profiled head 23 of a cylindrical, jet spreading member 22. The jet spreading member 22 provides a thread portion extending over its entire length for traversing a taphole in the bottom of the associated, cup-shaped jet adjusting handle 12.

The jet spreading member 22 located in the plane of the nozzle opening of the associated nozzle unit 9, which plane is parallel to the central axis 4 and is therefore under an upwardly opening obtuse angle to the associated nozzle axis, projects freely downwards. The lower end of the member 22 can be moved into or out of the water jet of the nozzle 9 by rotating the jet adjusting handle 12 and is held in self-locking manner in the particular set position. During adjustment with respect to the nozzle unit 9, as a result of the angular position the jet spreading member 22 not only approaches its axis, but also the exit opening of the nozzle, which it can almost cover in an axial view, so that the water jet passing out as a concentrated jet can be fanned out.

The upper end of the shaft 3 is closed by an end cap 24 which has a passage opening for the sprinkler unit 2. The cylindrical outer jacket 25 of the sprinkler head 6 is mounted from above on an end cap 26. The end cap 26 provides the bearing shaft 17, and is engaged on an upper, reduced diameter end portion of the casing 27 of the drive 7. The outer jacket 25, the end cap 26, and the casing 27 all have the same external diameter, the combination forming part of the outer body of the sprinkler unit 2. The rings 14,15 have substantially the same external diameters, as does the connecting outer jacket 30 of the base body 8. Thus, the sprinkler unit 2 is to this extent formed by longitudinally engaged, separate and substantially assembled components, but all said components together form an approximately continuous outer surface of constant cross-section, so that they successively contribute to guidance in the vicinity of the upper shaft opening.

The drive casing 27 is connected in non-rotary manner to an inner hollow shaft 28 extending through the rings 14,15. The shaft 28 is axially locked and mounted in rotary manner in a bearing socket 29 of the base body 8, said socket 29 projecting upwardly over the outer jacket 30. Between the bearing socket 29 and the hollow shaft 28, an intermediate sleeve is provided which provides a top end tread. The tread engages a drive pinion of a multistage reduction gear of the drive 7. This reduction gear is driven by a drive rotor in the form of a turbine wheel located in the upper end or within the end cap 26. The wheel is eccentric to the central axis 4, so that water flowing upwards through the hollow shaft 28 within the drive casing 27 flows through a rotation direction valve control located at right angles to the central axis 4 alongside the reduction gear, which is sealed relative to the water, and then drives the drive rotor adjacent in the axial direction to the reduction gear and to the valve control. The water leaving the drive 7 is then supplied through the end cap 26 and the bearing shaft 17, which is hollow over part of its length, to the nozzle unit 9 which has been set to operate. The rings 14,15 are mounted on the outer circumference of the bearing bush 29. With radial ribs or the like projecting upwards and past the outer circumference of the bearing socket 29, the base body 8 can engage in the ring jacket of the lower ring 15, so that it is additionally mounted and centered.

At a limited distance below its upper end, the outer jacket 30 has a frustum-shaped, upwardly tapering, circular end wall for connecting to the bearing socket 29.

A sieve or screen for holding back impurities is provided on the sprinkler unit 2 and can be raised and lowered together with the unit 2. A corresponding sieve 31 is appropriately easily interchangably or detachably inserted from below in the jacket 30 of the base body 8, so that the entire hollow cross-section of the jacket 35 is suitable for receiving a correspondingly large sieve 31.

The lifting device 5 includes a reciprocating piston 32 formed in one piece with the base body 8 and projecting at its lower end past the outer circumference of the outer jacket 30. The piston 32 is guided in positive rotation-prevented manner with respect to the shaft 3. The reciprocating piston 32 has a circular groove 33 open radially outwardly. A packing ring 34 is mounted in the groove 33. The internal diameter of the ring 34 is larger than the base diameter of the circular groove 33. The rotation prevention means 35 for the base body 8 is provided by two diametrically facing axial or longitudinal guides, which in each case have a projection 36 projecting past the otherwise cylindrical inner face of the shaft 3 and with a longitudinal groove 37 in the center of its width. The projections 36 do not extend to the upper end of the shaft 3. Instead, they only extend to a height reaching the higher longitudinal portion of the reciprocating piston 32 positioned below the circular groove 33. Thus, the packing ring 34 in the stroke end position becomes free from the projections 36 despite the fact that the rotation prevention persists. The packing ring 34 can be applied under the hydraulic pressure in sealing manner to the inner circumference of the shaft 3 and to the upper groove side of the circular groove 33.

The reciprocating piston 32 has a small radial clearance with respect to the shaft 3, so that at least one gap for passage of water is formed. Above and below the circular groove 33, the reciprocating piston 32 is provided with flattened portions of the outer circumference adapted to the projections 36 and over which project guide cams 38, which engage in the longitudinal grooves 37. The guide cams 38 (FIG. 11) positioned above the circular groove 33 in the stroke end position are located above the upper ends of the guide grooves 37, in which engage the guide cams 38 positioned below the circular groove 33. The upper ends of the projections 36 decrease in height in ramp-like manner, so that the packing ring 34 can run on and off.

The sprinkler unit 2 is only mounted to the lower end of the shaft 3 with the reciprocating piston 32 and to the upper end of the shaft 3 by means of a bearing 39. In between it is substantially contact-free relative to the shaft 3. The bearing 39 has a centering sleeve 40 inserted into the upper end of the shaft 3 and which has at the upper end a sleeve-like bearing bush 41 projecting upwards and downwards over a circular disk-like portion and on which the sprinkler unit 2 can be slidingly supported with said circumferential portions. The bearing bush 41 engages in the end cap 24 and has almost the same internal diameter as its passage opening for the sprinkler unit 2, so that both parts contribute to the bearing effect. In the concealed position, the jet adjusting handles 12 of the jet adjusting devices 13 are located essentially in the vicinity of the bearing gaps formed by these components. Because the jet adjusting handles 12 and their receptacles form gaps as a result of the irregular profiles forming them, water can still pass upwards in these areas in the concealed position.

The centering sleeve 40 engages with a sleeve jacket 42 on the inner face of the shaft 3. With the reciprocating piston 32 in the stroke end position, it strikes with its upper face on the lower end of said jacket 42. The stroke end position can be modified in a simple manner by modifying the length of the sleeve jacket 42 of the centering sleeve 40, which can be easily replaced by removing the end cap 24. In its axial position engaging on the upper end of the shaft 3 or on the inner face of the end cap 24, the centering sleeve 40 is only secured by a restoring spring 43 for the sprinkler unit 2. Said spring 43 surrounding the unit 2 at the outer circumference centered with its upper end between the bearing socket 41 and the sleeve jacket 42 engages on the circular disk-like intermediate portion. The lower end of the restoring spring 43 engages on the upper face of the reciprocating piston 32. There are no further components, apart from the centering sleeve 40 and the restoring spring 43 in the annular space between the sprinkler unit 2 and the shaft 3, so that said space can be made very small.

At a limited distance above the lower end of the one-part shaft 3 and below the reciprocating piston 32, in the concealed or flush position, on the jacket 46 of the shaft 3 is provided a sleeve-like connecting fitting or nipple 44, constructed in one piece therewith, while projecting approximately radially over the outer circumference. The outer circumference of the nipple is provided with a barb-like ring profile and circular ribs, in such a way that a mounted hose is securely held, even without additional hose clips. An extension of the connecting nipple 44 projecting inwards past the shaft jacket 46 is upwardly open between the longitudinal guides or rotation preventing means 45, so that water can flow axially from below against the center of the lower face of the reciprocating piston 32, which is essentially formed by the lower face of the sleeve 31. The projections 36 and longitudinal grooves 37 project downwards into the channel portion 47 formed by the extension.

The lower end of the shaft 3, which is cylindrical over most of its length, is formed by an angular, and in particular square, base flange 45 and whose basic shape is like that of the corresponding angular end cap 24. The base flange 45 projecting past the shaft circumference ensures secure anchoring in the soil, so that the shaft 3 only projects above the soil by the end cap 24. Immediately below the end cap 24, the shaft 3 can have angular profiles of a similar nature projecting past the outer circumference of the jacket 46 and then terminate flush with the soil surface.

The sprinkler head 6 or its nozzle units 9 can also be used as watering means other than as flush sprinklers. The bearing sleeve 18 of the head 6 is connected in one piece to the sprinkler head outer jacket 25 by means of a number of casing-like hollow spokes 48 corresponding to the number of nozzle units 9. The spoke interiors are supplied with water by supply openings 49 positioned roughly radially in the jacket of the bearing sleeve 18. The openings 49 and a single, radial flow opening in the hollow jacket portion of the bearing shaft 17 form a type of slide valve, in such a way that only the particular supply opening 49 coinciding with the overflow opening supplies the associated nozzle unit with water. The supply opening 49 issues into a circular jacket-like reception flange 50 located on the bottom of the associated hollow spoke 48. At the rear end of the one-part nozzle body 51 of the associated nozzle unit 9 is a complimentary plug-in flange 52. The reception flange 50 engages in close-coupled manner in a circular groove of the plug-in flange 52, and the outer boundary jacket of said circular groove engages in close-coupled manner in a circular groove of the hollow spoke 48 surrounding the reception flange 50. In the fixed state, the nozzle body 51 is located entirely within a blind hole depression 53 closely surrounding the body 51 and formed by the interior of the associated hollow spoke 48 and whose bottom is formed by the reception flange 50.

The external shapes and plug-in flanges of all the nozzle bodies 51, like the counterflanges and depressions of all the hollow spokes 48, are the same, so that each nozzle body 51 can be arranged in securely held and identically acting manner in any one of the depressions 53. For fixing the position, a snap connection is provided. The snap connection has on the jacket of the nozzle body 51 a rearwardly freely projecting, resilient spring catch 51 with a radially outwardly projecting catch nose. A catch opening 55 which is associated with the nose in the jacket of the depression 53 adjacent to the outer circumference of the bearing sleeve 18. For fixing purposes the nozzle body 51 is axially pressed into the depression 53, so that the catch 54 gives way elastically, resiliently and radially inwards until it jumps into the catch opening 55. In the latter it is accessible from the upper end of the sprinkler head 6, so that it can be pressed out for releasing the nozzle body 51 from the catch opening 55. Roughly in the extension of the spring catch 54 the nozzle body 51 has an attachment 56 projecting over its front face and constructed in one piece therewith and which is recessed in fork-like manner at the front end, so as to form a closely adapted orienting or guiding opening 57 for the displaceable reception of the jet spreading member 22. Thus, based on its central axis, the nozzle body 51 assumes a single, precisely defined position relative to the nozzle casing surrounding it.

Above each hollow spoke 48, the outer jacket 25 forms a pitch circular bounded pocket 58 which is open radially outwardly and at its upper end. In its lower base is provided a bore 59 leading into the depression 53. In each of these pockets 58 is located one of the jet adjusting handles 12, whereof only a single handle is shown in FIGS. 4 and 7. The internal diameter of the pockets 58 is closely adapted to the external diameter of the jet adjusting handles 12. A cylindrical attachment on the bottom of the particular jet adjusting handle 12 centrally engages in a depression in the bottom of the associated pocket 58. The shaft of the jet spreading member 22 is guided in the bore 59 aligned with the guiding opening 57 and directly following into the same.

The nozzle selecting handle 10 has on its jacket part projecting past its underside and engaging in centered manner on the inner circumference of the outer jacket 25 corresponding pockets 60, which are wider than the jacket thickness of the pockets 58, so that the latter can be inserted in the pockets 60 whereby the nozzle selecting handle 10 is prevented from rotating relative to the sprinkler head 6. The jet adjusting handles 12 are axially secured between the base faces of the two pockets 58,60, the hexagonal recess bearing sockets 21 projecting freely downwards from the bottom faces of the pockets 60. After removing the nozzles selecting handle 10, the jet adjusting handles 12 can be withdrawn from the bearing sockets 21 and the nozzle unit 9 can be easily detached and e.g. cleaned.

Each nozzle unit 9 or its nozzle body 51 has a single nozzle opening 61 in the form of a through-opening in the nozzle axial direction. The nozzle opening towards the front face 63 of the nozzle body 51 passes into an outlet opening 62 which is wider than its cross-section, so that part of its circumference is connected to a radially extending depression 64 in the face 63 at right angles to the nozzle axis 70. The nozzle opening 61, which forms the front, tapered end of a hollow, rounded nozzle channel 65, passing into the same and connected to the associated supply opening 49, is approximately cross-sectionally tear-shaped, so that it is bounded on its top surface by an approximately semi-circular round boundary 67 and in the lower area by an acute-angled, V-shaped flanked constriction 68. A depression 64 is connected to the constriction 68 over its full width or with a width corresponding to the diameter of the round boundary 67 so that the depression 64 forms a radial groove connected to the circumferential area of the nozzle opening 61. The depression 64, whose axial depth is greater than the axial extension of the nozzle opening 61 and whose base consequently extends into the widened area of the nozzle channel 65, is also tapered in acute-angled manner in its cross-section parallel to the axial plane of the nozzle opening 61, the flanks of the constriction 68 on the associated, radially inner end of the depression 64 coinciding with the flanks thereof and consequently the flanks of the constriction 68 slope rearwards with respect to the nozzle axis 70 roughly from the front face 69 to the flank tip. Consequently, in the vicinity of the constriction 68, the nozzle opening 61 forms on the radial, inner end of the depression 64 a depression inlet 66 extending over the associated partial circumference of the nozzle opening and through which part of the water flowing through said opening 61 passes into the depression 64. Simultaneously, the flanks of the constriction 68 of the nozzle opening 61 located in the depression flanks and also the round boundary 67 form separating edges for the through-flowing water, where the water is freed from the boundaries of the nozzle opening 61.

Thus, the upper part of the water jet associated with the round boundary 67 remains relatively well concentrated or focussed for obtaining a maximum range, while the water jet part passing out of the equilateral triangular constriction 68 is more extensively downwardly fanned out, and consequently the complete water jet strikes the ground linearly at a certain distance and not in circular manner. The lower part of the water jet is not impeded in its fanning effect by the depression 64, and in spite of this, the flank angle of the depression 64 is led to the front face 63, so that the fanning effect can be very precisely determined. At its end facing the nozzle opening 61 and close to the outer circumference of the nozzle body 51, the depression 64 is bounded by an end wall up to the front face 63, so that here again the associated water jet part is guided.

The greatest width of the nozzle opening 61 at right angles to its plane of symmetry coinciding with the median plane of the depression 64 is appropriately between 1 and 7 mm, particularly between 3 and 4 mm, said nozzle width varying by more than 0.5 mm and less than 1 mm for the different nozzles units 9 of the sprinkler head. The diameter of the associated jet spreading member 22 in said common axial plane of the nozzle opening 61 and the depression 64 is approximately the same as said nozzle width. All the jet spreading members 22 can have the same diameter, so that the member subject to action on its circumference has a slightly larger diameter than the width of a nozzle opening or depression and a slightly smaller diameter than a further nozzle opening or depression.

With the approximately right-angled or conical tip at the lower end of the particular jet spreading member 22, the associated nozzle opening 61 can be almost completely closed at its front end so that a larger or the largest part of the water entering the nozzle opening 61 is deflected by the depression inlet 66 into the associated depression 64 and passes out of the same. The particular depression 64 is located on the side of the associated nozzle opening 61 facing the guidance opening 57 and has a greater longitudinal extension than its width. The inventive construction is particularly suitable for nozzles, which are operated with an arrangement diverging from an approximately vertical position of the nozzle axis, in such a way that the common median plane of the nozzle opening 61 and the depression 64 is approximately vertical and the constriction 68 is positioned below the round boundary 67. The greater the rotation angle of the sprinkler head 6, the greater is the water flow through the nozzle.

For the locking of the sprinkler head 6 in the operating position associated with a particular nozzle unit 9, the handle 10 according to FIG. 7 has an internal circumferentially projecting locking cam 71, which can snap into not shown locking depressions of the locking cover 19.

FIGS. 1 and 8–10 show that, in the bottom area of the lifting cylinder formed by the shaft 3 and located above the base flange 45, a drain valve 74 is provided whose axis is at right angles to the central axis 4. In the central axis of the connecting nipple 44 or the channel portion 47, and also with respect to the closing force acting thereon, said drain valve 74 is positioned directly in the flow of the inflowing water, whereby said flow is deflected at right angles upwards to the inlet under the reciprocating piston 32. In a partition closing the channel portions 47 at the associated end and constructed in one piece with the shaft 3 a valve bore 73 is provided, in which snaps a setbolt-valve body 74 in axially displaceable manner between two end positions in such a way that its head 76 is located in the channel portion 47. Around the shaft of the valve body 74 and following on to the head 76 is provided a valve packing 75 in the form of an O-ring, with which is associated as the valve seat 78 the face of said partition. In the relaxed position, according to FIG. 10, the valve packing 75 is not planar and flat and is instead curved at right angles to its plane, so that it must be resiliently pre-tensioned for transferring into its approximately planar closed position. The valve body 74 has a snapping member located on its longitudinally slotted shaft end and which simultaneously forms the end stop for the axial movement of the valve body 74 facing the head 76 or the valve packing 75, making it possible to mount the valve body 74 merely by inserting it in the valve bore 73 form the channel portion 47.

To the partition forming the valve seat 78 is directly connected the supply opening 79, provided at the top in the jacket of the channel portion 47 and issuing under the reciprocating piston 32 resting on rib stops in the concealed position. After opening a stop valve associated with the supply line, the water flowing in via the connecting nipple 44 first strikes the head 76 of the valve body 74, where it is deflected upwards and simultaneously presses it in impact-like manner against the valve seat 78 under the aforementioned pretension of the valve packing 75, so that the drain valve 72 is closed and remains closed under the building pressure. Under said hydraulic pressure the sprinkler unit 6 is raised counter to the tension of the return spring 43 into the working position according to FIG. 2.

Figure 10:
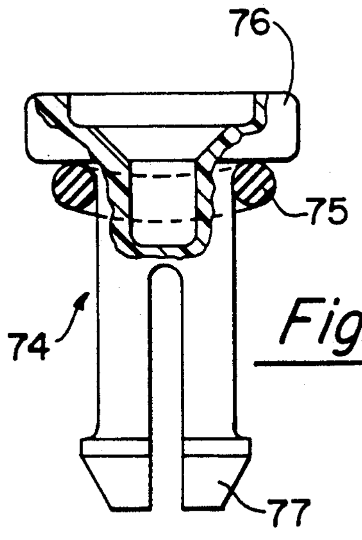
FIG. 10 is a side view of a drain valve closure.

As soon as the hydraulic pressure in the flush sprinkler has dropped below a given value by interrupting the water supply, accompanied by a return towards its curved position in FIG. 10, the valve packing 75 presses the head 76 away from the valve seat 78, so that gaps form on two facing circumferential areas of the valve packing 75 or the valve seat 78 through which the water can enter the valve bore 73, which is slightly wider than the shaft of the valve body 74, and can flow away through the same below the bottom of the reciprocating or lifting cylinder and through the hollow base flange 45 into the soil.

As the reciprocating piston 32 is lowered under the tension of the compression spring 43 and until the complete lowering a corresponding hydraulic pressure is maintained in the cylinder area or chamber through which the valve body 74, after initial gap opening by the valve packing 75 can optionally be completely transferred into its widest possible opening position and through which the water in the cylinder chamber is at least partly forced out through the drain valve 72. As displayed in FIG. 8, the bottom 80 of the cylinder can fall away to the supply opening 79 which can also serve as a discharge opening, ensuring a complete emptying of the cylinder and also the water in the sprinkler unit 2. As the upper bearing of the sprinkler unit is not completely tight, at least in the concealed position, a vent is formed, through which any water which may have remained in the shaft 3 and the sprinkler unit is not prevented from completely draining away.

For the flushing of the flush sprinkler, particularly of any parts which may have remained on the outer circumference of the sprinkler unit 2 through dirtying and which impair its function, an integrated flushing device 81 is provided before reaching its working or stroke end position or at least during the entire stroke, through which part of the outflowing water is branched off between the reciprocating piston 32 and the piston travel path and is pressed upwards between the outer circumference of the sprinkler unit 2 and the cylinder jacket by a control acting like a valve.

Figure 9:
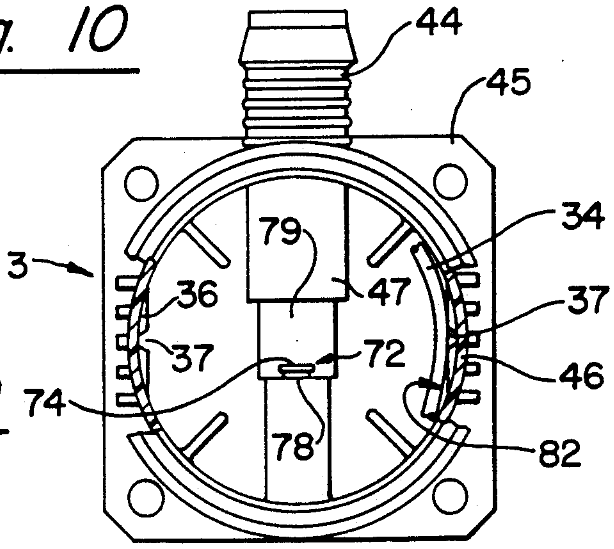
FIG. 9 is the shaft according to FIG. 8 in plan view.

FIG. 9 shows a circumferential portion of the piston packing ring 34 in a partial leaking position, in which it is pressed inwards out of its circular shape by the projections 36, so that overflow gaps are formed on either side of said projections 36, as well as along the longitudinal grooves 37. If the inflowing water flows from below against the reciprocating piston 32, then part of said water can flow through the overflow gaps upwards along the longitudinal grooves 37 to the reciprocating piston 32, so that the longitudinal guides forming the rotation preventing means 35 can be cleaned and simultaneously there is a water lubrication for the guide cams 38.

This water flows upwards and, at the latest, after filling the annular space, flows out through the upper bearing gap, so that the latter can also be cleaned and lubricated during the stroke or travel. The height of the cross-sectionally circular portion-like bounded projections 36 decreases in ramp-like manner at their upper ends by chamfering, so that the sealing ring 34 on reaching the stroke end position comes free form the projections 36 or the longitudinal grooves 37 and said overflow gaps are closed again.

As soon as the sprinkler unit 2 starts to return to its concealed or flush position from its stroke end position the overflow gaps are opened and once again there is a flow-through of water, which ensures the easy operation of the piston guide. As the cross-section of the sealing ring 34 is smaller than that of the circular groove 33, the latter is also flushed. Thus, the water not only passes between the guide cam 38 according to FIGS. 11 and 12 and the longitudinal grooves 37, but also over a large part of the remaining circumference of the reciprocating piston 32 and consequently flushes the entire piston travel path. Thus, the reciprocating piston 32 can be guided in a floating and almost contact-free manner with respect to the piston travel path.

When the shaft is filled with water and the water-through flow is blocked, by a pump-like manual pressing down or raising of the sprinkler unit 2, said cleaning action can be made more intense, so that any sprinkler unit 2 which may become difficult to operate can be made easy to operate again in a simple manner. The flushing valve 82 formed by the packing ring 34 and the projections 36 is not only opened and closed in position-dependent manner but can also be further opened compared with its position-dependent opening position by pressure increases.

The flush sprinkler according to the invention has a simple construction, assembly, installation, maintenance, service and operation with respect to each of its components, while being functionally reliable, not prone to faults and rapidly reacting when the water supply is opened. Because the nozzle units 9 are open towards the shaft 3 in the concealed, flush position, at the start of the stroke, the shaft interior is also flushed through the nozzle unit 9. The sprinkler head 6 starts its rotary movement and consequently it is not only the outer circumference of the sprinkler unit 2 which is flushed from top to bottom before leaving the shaft 3, but also during the passage of the nozzle unit 9 through the upper bearing gap its boundary associated with the shaft 3 is precleaned by flushing. In addition, the sprinkler unit 2 is vented by the nozzles in the flush position.

We claim:

1. A sprinkler for soil irrigation operations, said operations specifying a plurality of operating parameters, said sprinkler comprising:

a sprinkler unit having at least two nozzle ports ductively connectable to a fluid supply, each nozzle port establishing at least one fluid discharge state; in operation, said fluid supply defining an operative fluid pressure; and a nozzle selecting device for varying at least one of said operating parameters by selectively switching between a discharge state of one of said nozzle ports and another discharge state of the other of said nozzle ports, independently from said fluid pressure, said sprinkler unit defining a central unit axis, at least one of said two nozzle ports being oriented transverse to said central unit axis.

2. The sprinkler according to claim 1 wherein said nozzle selecting device includes a nozzle selecting handle for switching between said discharge states, said nozzle selecting device being operationally connected to a supply port for said nozzle ports, said nozzle selecting device being provided for switching said at least two nozzle ports to a shut-off state.

3. The sprinkler according to claim 1, further comprising a fluid motor for said sprinkler unit and a fluid ducting drive casing for enclosing said fluid motor, said drive casing defining an external circumference of said sprinkler unit and bearing at least one of said nozzle ports.

4. The sprinkler according to claim 1, further comprising a rotatory drive means, said sprinkler unit including a sprinkler head supporting said at least two nozzle ports and fixed to an upper reduced end of said rotary drive means, and an end cap engaging said upper end and defining an external circumference of said rotary drive means for driving said sprinkler head.

5. The sprinkler according to claim 1, further comprising a sprinkler head, and external jacket below said sprinkler head and a base unit below said external jacket; and wherein, between said sprinkler head, bearing at least one of said at least two nozzle ports, and said base unit rotatably supporting said sprinkler head, said external jacket of said sprinkler unit has constant external cross-sections over most of an entire length extension of said sprinkler unit and is multiply subdivided into subunits along said length extension.

6. The sprinkler according to claim 5, wherein said subunits provide at least one of mounting units defined by an end cap, a drive casing of a preassembled drive means and juxtaposed, annular ring handles.

7. A sprinkler for soil irrigation operations, said operations specifying a plurality of operating parameters, said sprinkler comprising:

a sprinkler unit having at least two nozzle ports ductively connectable to a fluid supply, each nozzle port establishing at least one fluid discharge state; in operation, said fluid supply defining an operative fluid pressure; and a nozzle selecting device for varying at least one of said operating parameters by selectively switching between a discharge state of one of said nozzle ports and another discharge state of the other of said nozzle ports, independently from said fluid pressure, said sprinkler unit being transferable between a retracted position and an irrigating position, said nozzle selecting device for switching between said discharge states being manually accessible and operable in both said retracted position and said irrigating position.

8. A sprinkler for soil irrigation operations, said operations, specifying a plurality of operating parameters, said sprinkler comprising:

a sprinkler unit having at least two nozzle ports ductively connectable to a fluid supply, each nozzle port establishing at least one fluid discharge state; in operation, said fluid supply defining an operative fluid pressure; and a nozzle selecting device for varying at least one of said operating parameters by selectively switching between a discharge state of one of said nozzle ports and another discharge state of the other of said nozzle ports, independently from said fluid pressure, said sprinkler further comprising a shaft and wherein said nozzle selecting device includes a nozzle selecting handle for switching between said discharge states, said nozzle selecting handle serving as an end cap for said shaft receiving said sprinkler unit, said nozzle selecting handle engaging said shaft around an upper shaft opening.

9. A sprinkler comprising:

a sprinkler unit having at least one nozzle port and a jet forming member for said nozzle port, said jet forming member being rotationally fixed relative to said nozzle port during an adjustment motion of said jet forming member, said jet forming member including a bolt-shaped member displaceable into a fluid flow passing through said nozzle port.

10. The sprinkler according to claim 9, further comprising a jet adjusting handle, said jet forming member being secured against rotation with respect to said jet adjusting handle, which adjusts said jet forming member, said jet adjusting handle being separate from said jet forming member.

11. The sprinkler according to claim 9, further comprising a jet adjusting handle, said jet forming member being positionally adjusted with respect to said nozzle port by said jet adjusting handle located between said nozzle port and a top face of said sprinkler unit along an outer circumference of said sprinkler unit.

12. The sprinkler according to claim 11, wherein said jet forming member has a head portion mounted with a slide-fit in said jet adjusting handle.

13. The sprinkler according to claim 9, further comprising a jet adjusting handle displaceably receiving a head portion of said jet forming member.

14. The sprinkler according to claim 9, further comprising a shaft for receiving said sprinkler unit in a retracted, non-operational position and allowing said sprinkler unit to raise to a raised, operational position and further comprising a jet adjusting handle for adjusting said jet forming member, said jet adjusting handle being concealed in said shaft when said unit is in said retracted, non-operational position.

15. The sprinkler according to claim 9, further comprising a number of jet adjusting handles for adjusting said jet forming members of separate nozzle ports, said jet adjusting handles being mounted in an annular zone around a central axis of said sprinkler unit, said jet adjusting handles being rotatable about axes substantially parallel to said central axis.

16. The sprinkler according to claim 9, further comprising at least one nozzle unit provided in said at least one nozzle port and having a guide opening located downstream of said at least one nozzle port for displaceably receiving said jet forming member.

17. The sprinkler according to claim 9, further comprising a fluid pump having a thrust piston in said sprinkler unit and at least one of members defined by a filter and a sieve for supplied water being substantially exclusively positioned on said sprinkler unit and defining a fluid responding end face of said thrust piston.

18. The sprinkler according to claim 9, further comprising a pump having a piston in said sprinkler unit and at least one of members defined by a filter and a sieve being inserted in an outer jacket of said piston to essentially provide an end face of said piston and substantially fill an internal cross-section of said piston.

19. A sprinkler for soil irrigation operations, said operations having a plurality of operating parameters, said sprinkler comprising:

a sprinkler unit and a control means having at least two control handles for controlling at least two of the operating parameters;

a first of said at least two handles being mounted on said sprinkler unit, the other of said at least two handles being mounted on said first handle.

20. A sprinkler for soil irrigation operations, said operations specifying a plurality of operating parameters, said sprinkler comprising:

a sprinkler unit having at least two nozzle ports ductively connectable to a fluid supply, each nozzle port establishing at least one fluid discharge state; in operation, said fluid supply defining an operative fluid pressure; and a nozzle selecting device for varying at least one of said operating parameters by selectively switching between a discharge state of one of said nozzle ports and another discharge state of the other of said nozzle ports, independently from said fluid pressure, said nozzle selecting device providing a selecting valve including a valve member and a valve opening, at least one of said at least two nozzle ports being displaceably mounted with said nozzle selecting device on a central supply shaft providing said selecting valve member and said valve opening.

21. A sprinkler for soil irrigation operations, said operations specifying a plurality of operating parameters, said sprinkler comprising:

a sprinkler unit having at least two nozzle ports ductively connectable to a fluid supply, each nozzle port establishing at least one fluid discharge state; in operation, said fluid supply defining an operative fluid pressure; and a nozzle selecting device for varying at least one of said operating parameters by selectively switching between a discharge state of one of said nozzle ports and another discharge state of the other of said nozzle ports, independently from said fluid pressure, said nozzle selecting device including a nozzle selecting handle and said sprinkler further comprising at least one nozzle unit provided in one of said nozzle ports and fixed by a snap fastening to said nozzle selecting handle.

22. A sprinkler for soil irrigation operations, said operations specifying a plurality of operating parameters, said sprinkler comprising:

a sprinkler unit having at least two nozzle ports ductively connectable to a fluid supply, each nozzle port establishing at least one fluid discharge state; in operation, said fluid supply defining an operative fluid pressure; and a nozzle selecting device for varying at least one of said operating parameters by selectively switching between a discharge state of one of said nozzle ports and another discharge state of the other of said nozzle ports, independently from said fluid pressure, said nozzle selecting device further comprising a nozzle selecting handle, at least one of said at least two nozzle ports being arranged on a sprinkler head constructed as a hollow jacket and fixedly connected to said nozzle selecting handle.

23. The sprinkler according to claim 22, wherein said sprinkler head is connected by means of internally located transverse spokes to an internal bearing sleeve rotatably mounted for permitting switching between said discharge states.

24. A sprinkler comprising:

a sprinkler unit including a base body, a sprinkler head connected to said base body and a drive casing of a rotary drive for rotating said sprinkler head relative to said base body about a central, longitudinal axis of said sprinkler head, said drive casing being rotatably mounted and axially locked with respect to said base body, said base body and said drive casing providing longitudinally subdivided subunits of said sprinkler unit, wherein said sprinkler head has at least one nozzle port, said drive casing bearing said drive means and being provided to rotate with said sprinkler head.

25. The sprinkler according to claim 24, further comprising at least one ring handle and wherein at least one of drive characteristics defined by a stop-limited rotation angle and a circumferential positioning of said rotation angle is adjustable with said at least one ring handle located on an outer circumference of said sprinkler unit.

26. The sprinkler according to claim 25, wherein said at least one ring handle is an adjusting ring forming a longitudinally extending portion of the outer circumference of said sprinkler unit.

27. The sprinkler according to claim 25, wherein said at least one ring handle in at least one adjustment position is positionally fixed with respect to a base body rotatably carrying said sprinkler head.

28. A sprinkler comprising:

a sprinkler unit transferable between a retracted position and a working position and at least one bearing for said sprinkler unit, wherein a through-flow flushing means is provided for said bearing of said sprinkler unit, a valve ring of a control valve for said flushing means being operationally displaceable with respect to said sprinkler unit and being mounted on said sprinkler unit.

29. The sprinkler according to claim 28, wherein a fluid duct is provided for flushing of mounting gaps formed by a longitudinal guide and a gap between said sprinkler unit and a shaft receiving said sprinkler unit, means being provided for deforming said valve ring between a substantially closed position and an open position of said control valve.

30. The sprinkler according to claim 28, wherein said sprinkle unit is raisable under fluid pressure out of a shaft and is partly sealed with respect to said shaft by said valve ring being located in a circumferential annular groove of a thrust piston on said sprinkler unit, said valve ring being arranged in said groove in floating manner with motion clearances.

31. The sprinkler according to claim 28, wherein said valve ring is transferable from a permeable position to a sealing position under a fluid pressure, at least one of said positions being a stop position limited by stop means separate from said valve ring.

32. A sprinkler comprising:

a sprinkler unit transferable between a retracted position and an irrigated position; a shaft displaceably receiving said sprinkler unit having an inner tubular surface in the form of a cylindrical travel path forming a rotation preventing means including at least one longitudinal projection and at least one longitudinal groove; and a packing ring for operationally sliding from said rotation preventing means onto a circumferentially uninterrupted bearing face of said shaft.

33. A sprinkler comprising:

a sprinkler unit defining a central sprinkler axis of said sprinkler and a drain valve defining a central valve axis, said drain valve reciprocating along said central valve axis, wherein said central valve axis is oriented transverse to said central sprinkler axis.

34. A sprinkler comprising:

a sprinkler unit, a shaft receiving said sprinkler unit, and a drain valve comprising a bolt-like valve body, a valve borer and a valve packing, wherein said drain valve is provided in a lower region of said shaft, said bolt-like valve body being displaceable in said valve bore providing a drain opening, said valve body being sealingly mounted with said valve packing resiliently constructed for slightly opening said drain valve from an initial, at least partially closed position.

35. A sprinkler comprising:

a sprinkler unit and a connecting nipple for connecting said sprinkler to a fluid supply line, wherein said connecting nipple is projecting past an outer circumference of said unit transverse to a central axis of said sprinkler unit, said nipple providing a one-piece unit with a shaft receiving said sprinkler unit.

36. A sprinkler for soil irrigation operations, said operations specifying a plurality of operating parameters, said sprinkler comprising:

a sprinkler unit having at least two nozzle ports ductively connectable to a fluid supply, each nozzle port establishing at least one fluid discharge state; in operation, said fluid supply defining an operative fluid pressure; and a nozzle selecting device for varying at least one of said operating parameters by selectively switching between a discharge state of one of said nozzle ports, another discharge state of the other of said nozzle ports and a shut off state, independently from said fluid pressure and further comprising a sprinkler jacket having an external jacket circumference enveloping a longitudinal jacket axis of said sprinkler unit, at least one of said at least two nozzle ports being oriented substantially transverse to said longitudinal jacket axis.

37. The sprinkler according to claim 36, wherein said nozzle selecting device includes a nozzle selecting handle for manually switching between said discharge states, said nozzle selecting handle being positioned on an upper end of said sprinkler unit and having a disk-shaped gripping ring.

38. The sprinkler according to claim 36, wherein said sprinkler unit has a longitudinal length parallel to said jacket axis, said sprinkler jacket providing an external jacket connecting to said at least one nozzle unit, at least one of said at least two nozzle ports being fixed in at least one of said fluid discharge states with respect to said external jacket, at least one of said at least two nozzle ports being orientated transverse radially outwardly with respect to said jacket circumference.

39. The sprinkler according to claim 36, wherein at least one of said at least two nozzle ports is movably mounted with respect to a supply opening by said nozzle selecting device located on an upper end face of said sprinkler unit, said supply opening being radially outwardly directed with respect to said jacket axis.

* * * * *